Feb. 14, 1928. 1,658,980

C. LE G. FORTESCUE

PHASE BALANCING SYSTEM

Filed June 23, 1925 2 Sheets-Sheet 1

WITNESSES:
G. S. Neilson
O. B. Buchanan

INVENTOR
Charles Le G. Fortescue
BY
Wesley S. Carr
ATTORNEY

Feb. 14, 1928.  1,658,980
C. LE G. FORTESCUE
PHASE BALANCING SYSTEM
Filed June 23, 1925  2 Sheets-Sheet 2

WITNESSES:
G. S. Neilson
O. B. Buchanan

INVENTOR
Charles Le G. Fortescue
BY
Wesley S. Carr
ATTORNEY

Patented Feb. 14, 1928.

1,658,980

UNITED STATES PATENT OFFICE.

CHARLES LE G. FORTESCUE, OF PITTSBURGH, PENNSYLVANIA, ASSIGNOR TO WESTING-HOUSE ELECTRIC & MANUFACTURING COMPANY, A CORPORATION OF PENNSYLVANIA.

PHASE-BALANCING SYSTEM.

Application filed June 23, 1925. Serial No. 38,975.

My invention relates to phase-balancing systems and it has particular relation to such systems of this character as employ single-phase synchronous condensers for effecting a phase balance.

Many different ways have been proposed heretofore for balancing a three-phase or four-phase line, or, in general, any polyphase system, by means of single-phase impedances.

It is an object of my present invention to simplify such systems and to provide novel means and methods for the control and operation thereof.

A more specific object of my invention is to provide a system wherein two single-phase reactance devices may be utilized to balance the voltage and current in a three-phase or four-phase system or, in general, in any polyphase system.

A still more specific object of my invention is to provide a system utilizing two reactance devices for regulating two of the single-phase components of the delta voltages across three line-conductors of a polyphase system in such manner as to provide an equality, or any other predetermined relation, between the magnitudes of said single-phase components and the third single-phase component of the delta voltages.

A further object of my invention is to provide a system wherein diametrically connected balanced two-phase power of any power factor may be interchanged with diametrically connected single-phase power of unity power factor, by means of two synchronous condensers equipped with voltage regulators.

Figure 1:
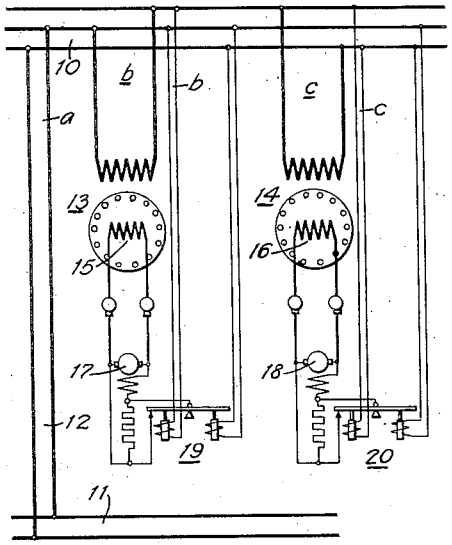
Figure 2:
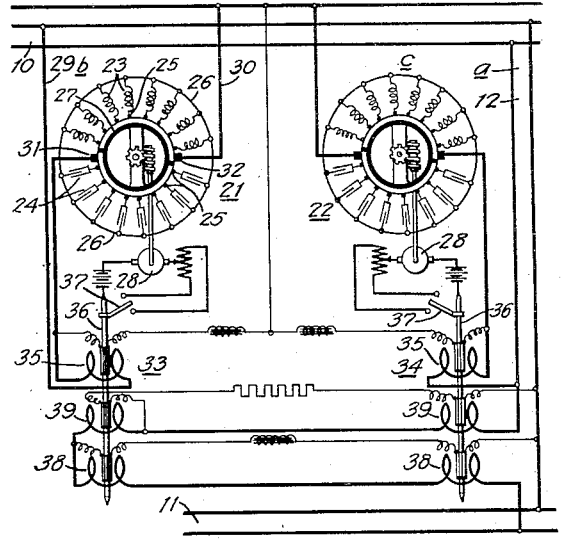
Figure 3:
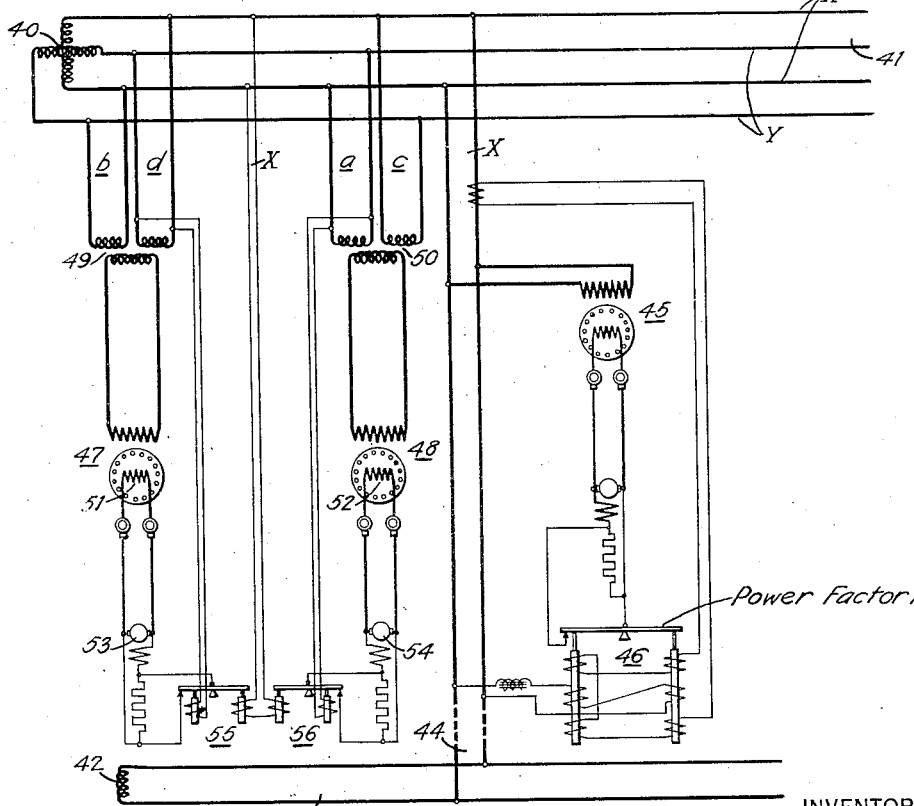
Figure 4:
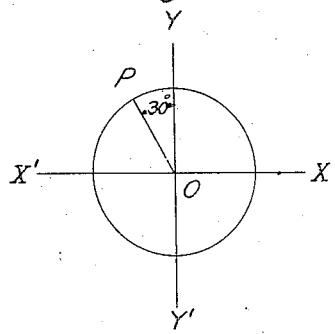
Figure 5:
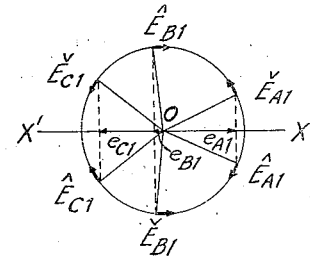
Figure 6:
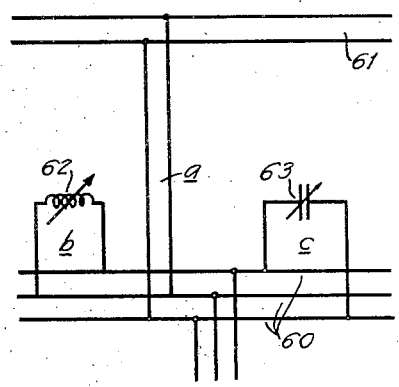
Figure 7:
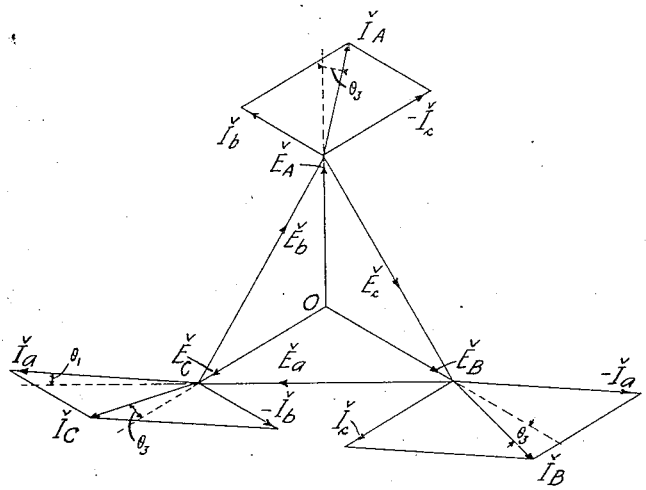
Figure 8:
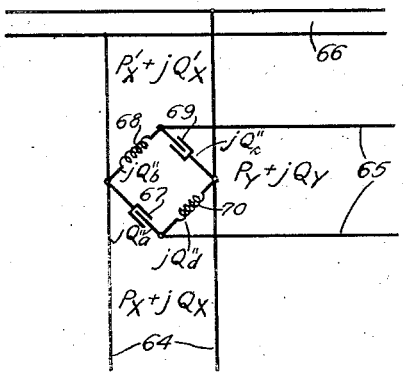
Figure 9:
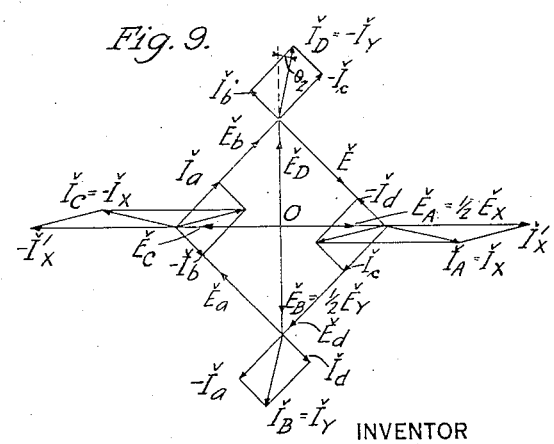

With the foregoing and other objects in view, my invention consists in the methods and apparatus set forth in the following description and illustrated in the accompanying drawing, wherein Figure 1 is a diagrammatic view of apparatus and circuits utilizing two single-phase synchronous condensers and embodying my invention in a three-phase system, Fig. 2 is a similar view wherein static reactors are substituted for the synchronous condensers, the control means being also somewhat different, Fig. 3 is a similar view utilizing two single-phase synchronous condensers for balancing the power on a two-phase line which is also interchanging unity-power-factor power with a single-phase system, Figs. 4 and 5 are vector diagrams illustrating the general theory of vector representation referred to hereinafter, Figs. 6 and 8 are schematic diagrams illustrating the mathematical analysis of my three-phase system and my two-phase system, respectively, and Figs. 7 and 9 are vector diagrams corresponding to Figs. 6 and 8, respectively.

In the form of my invention shown in Fig. 1, a three-phase line 10, having the delta phases $a$, $b$ and $c$, is connected to a single-phase line 11 through a tie line 12, connected to phase $a$, for interchange of power in either direction between the two systems. The voltages and currents of the three-phase line are both balanced automatically by means of two single-phase synchronous condensers 13 and 14 connected across phases $b$ and $c$, respectively, and having their field windings 15 and 16 excited from small dynamo-electric exciters 17 and 18, the voltages of which are controlled by means of automatic voltage regulators of any approved type, symbolically indicated at 19 and 20, for balancing the voltages of phases $b$ and $c$, respectively, against the voltage of phase $a$. If the three voltages $a$, $b$ and $c$ are made equal, a balanced three-phase system is produced. If the voltages are maintained in any other fixed relationship, as by making one of the voltages equal to 1.414 times either of the others, a balanced two-phase voltage or any other desired voltage relationship may be maintained in the polyphase line.

In Fig. 2 is shown a similar system, wherein static reactor mechanisms 21 and 22 are substituted for the single-phase machines 13 and 14, and wherein the control is effected by wattmeters instead of voltmeters. Each of the static reactor mechanisms comprises a series of static reactor elements 23 and 24, arranged like the spokes of a wheel, terminating, at their inner ends, with brushes 25, and connected, at their outer ends, to a common conductor 26. All of the reactor elements 23 on one side of a diameter are inductive and all of the reactor elements 24 on the other side of the diameter are capacitive. The brushes 25 bear upon a rotatable two-segment commutator 27 which is geared to a small regulating motor 28. The terminal leads 29 and 30 of each of the static reactor mechanisms 21 and 22 terminate in diametrically disposed brushes 31 and 32, also bearing upon the commutator member 27. As the commutator member is rotated, the reactance is gradually changed from a minimum inductive reactance, through infinity, to a minimum capacitive reactance, and vice versa.

The two regulating motors 28 of the static reactance devices 21 and 22 are separately controlled by means of separate wattmeter regulating mechanisms, symbolically indicated at 33 and 34, respectively. It will be understood that any usual or suitable wattmeter units may be utilized in the organization. For the sake of simplicity of illustration, showing the principle of the regulation, each of regulators 33 and 34 is provided with a wattmeter 35, connected to measure the wattless power flowing in its associated reactance device 21 or 22, and mounted on a shaft 36 carrying a reversing-switch mechanism 37 for controlling the respective regulating motors 28.

The shaft 36 of each of the regulators 33 and 34 is also provided with two additional wattmeters 38 and 39. Each of the wattmeters 38 is connected to measure the wattless power flowing in the single-phase tie-line 12, which is connected to phase $a$ of the polyphase line 10, and each of said wattmeters 38 is connected in such direction as to oppose the associated wattmeter 35. The wattmeters 39 are connected to measure $\frac{1}{3}\sqrt{3}$ or 0.577 times the real power flowing in the tie-line 12. The wattmeter 39 of the regulating mechanism 34 in phase $c$ opposes its associated wattmeter 35, when the single-phase line 11 is drawing energy from the polyphase line, while the wattmeter 39 of the other regulating mechanism 33 is connected to assist its associated wattmeter 35. It will be shown, hereinafter, that the mechanisms just described produce balanced conditions in the polyphase line 10, regardless of the power interchanged with the single-phase line 11.

In Fig. 3 is shown an organization wherein a diametrically connected two-phase translating device 40 is connected to a two-phase line 41 having the diametrical phases X and Y and the mesh phases $a$, $b$, $c$ and $d$, respectively. A single-phase translating device 42 is connected to a single-phase line 43 which is tied to phase X of the two-phase line by means of a tie line 44 for the interchange of power in either direction. It will be shown hereinafter that the single-phase power will have to have unity power factor in order that the polyphase power may be balanced by a single-phase apparatus hereinafter described. I have shown, therefore, a synchronous condenser 45 connected across the single-phase line or tie line 44 and controlled by means of an automatic power-factor relay 46 for maintaining unity power factor in the tie line 44. The power-factor relay 46 may be of any desired type, that shown in the present application being the relay described and claimed in an application of C. A. Boddie, Serial No. 342,176, filed December 3, 1919, patented July 28, 1925, No. 1,547,728, and assigned to the Westinghouse Electric and Manufacturing Company.

The polyphase voltages and currents in the polyphase line 41 are both balanced by means of two single-phase synchronous condensers 47 and 48 which are connected to the secondary windings of two transformers 49 and 50, respectively. Each of said transformers has two primary windings having the same number of turns, the primary windings of the transformer 49 being connected across the phases $b$ and $d$, respectively, and the primary windings of the transformer 50 being connected across the phases $a$ and $c$, respectively. The field windings 51 and 52 of the single-phase condensers 47 and 48 are excited by means of small dynamo-electric generators 53 and 54, the voltages of which are automatically controlled by means of any suitable voltage regulators, as indicated symbolically at 55 and 56, whereby the voltages in phases $d$ and $a$, respectively, are balanced against the voltage in phase X, the number of turns in the voltage coils being so adjusted that the voltages in phases $d$ and $a$ are equal to 0.707 times the voltage in phase X.

As the calculation of the required K. V. A. condenser capacity and the determination of the restrictions which must be imposed to secure proper operation are somewhat difficult, it appears to be desirable to indicate the method of calculation in order that those skilled in the art may have all the information necessary to the practical application of my invention. In the interests of certainty as to the algebraic signs and as to the precise meaning of the conventional representations of periodic functions, I shall first briefly develop the fundamental conceptions upon which my calculations are based.

*General explanation of conventions relating to vectors.*

In the vectorial representation of alternating-current systems, the multiplier $(-1)$ reverses a vector, or rotates it through 180°. The multiplier $\sqrt{-1}$, usually written $j$, is employed to indicate the rotation of a vector through 90° in the positive or counter-clockwise direction, since, if the operation $j$ is performed twice, the result will be a multiplication by $j^2$ or $(-1)$.

If 1, $a$ and $a^2$ are the cube roots of unity, it follows that the operator $a$ rotates a vector 120° in the counter-clockwise direction, and if the operation $a$ is performed three times we have unity or a complete revolution. Representing the vectors according to a system of rectangular co-ordinates, as shown in Fig. 4, it is apparent that if a circle of unity radius is drawn with its center at the origin, a point P in the second quadrant of the circle, defining an angle POX=120°, will have co-ordinates, $x = -\frac{1}{2}, y = \frac{1}{2}\sqrt{3}$.

Hence, $$\begin{rcases} a = -\frac{1}{2} + \frac{1}{2}\sqrt{3}j \\ a^2 = -\frac{1}{2} - \frac{1}{2}\sqrt{3}j \\ 1 + a + a^2 = 0 \\ a^3 = 1. \end{rcases} \quad (1)$$

Thus, the operator $j$ advances a vector 90° in time phase, the operator $a$ advances it 120°, and the operator $a^2$ retards it 120°, assuming counter-clockwise rotation of the vectors.

The most general expression for a simple harmonic quantity $e$ is $$e = A \cos \omega t - B \sin \omega t. \quad (2)$$

$$\begin{rcases} \check{E} = E\epsilon^{j\omega t} = (A + jB)\epsilon^{j\omega t} \\ \qquad = A \cos \omega t - B \sin \omega t + j(A \sin \omega t + B \cos \omega t), \\ \text{and} \quad \hat{E} = E\epsilon^{-j\omega t} = (A - jB)\epsilon^{-j\omega t} \\ \qquad = A \cos \omega t - B \sin \omega t - j(A \sin \omega t + B \cos \omega t). \end{rcases} \quad (5)$$

Hence, from equations (4) and (5), the instantaneous value of the harmonic quantity is $$e = \frac{1}{2}(\check{E} + \hat{E}). \quad (6)$$

A simple harmonic quantity having the instantaneous value $e$ may thus be represented vectorially by either $\check{E}$ or $\hat{E}$, being the real part of the vector $\check{E}$ or $\hat{E}$, or the projection of the same upon the datum line or X-axis. If the scalar value of $\check{E}$ or $\hat{E}$ is measured as the peak value of the harmonic quantity, the instantaneous value $e$ is readily found from equations (5) and (6). Thus, $e = $ real part of $\check{E}$
$\quad = $ " " " $E\epsilon^{j\omega t}$
$\quad = $ " " " $E(\cos \omega t + j \sin \omega t)$
$\quad = E \cos \omega t.$ The positively rotating, or counter-clock- It is known (e. g., in Steinmetz's "Engineering Mathematics," page 83) that $$\begin{rcases} \epsilon^{ju} = \cos u + j \sin u \\ \epsilon^{-ju} = \cos u - j \sin u, \\ \text{whence,} \quad \cos u = \frac{1}{2}(\epsilon^{ju} + \epsilon^{-ju}) \\ \text{and} \quad \sin u = \frac{1}{2}j(\epsilon^{-ju} - \epsilon^{ju}), \end{rcases} \quad (3)$$

where $\epsilon$ is the base of the Naperian logarithms.

In exponential form, the general expression for a simple harmonic quantity $e$ thus becomes $$e = \frac{1}{2}(A + jB)\epsilon^{j\omega t} + \frac{1}{2}(A - jB)\epsilon^{-j\omega t}. \quad (4)$$

The quantity $(A + jB)\epsilon^{j\omega t}$ represents a vector of length $E = \sqrt{A^2 + B^2}$ rotating in the positive or counter-clockwise direction with an angular velocity $\omega$, while the quantity $(A - jB)\epsilon^{-j\omega t}$ is the conjugate vector rotating at the same angular velocity in the opposite direction. Positively rotating vectors will be indicated with a distinguishing mark ($\check{\ }$), thus $\check{E}$, and the conjugate vectors will be indicated with another distinguishing mark ($\hat{\ }$), thus $\hat{E}$.

We have, therefore, wise rotating, vector $\check{E}$ is a vector of magnitude E rotating at a constant angular velocity $\omega = 2\pi f$, and it is commonly employed to represent the harmonic quantity $e$, although its conjugate $\hat{E}$ is equally available, as indicated in Fig. 5, wherein the directions of rotation of the vectors are indicated by arrows.

In any polyphase vector system, the vectors individually rotating in the positive direction, one phase is marked A, the next lagging phase is ordinarily marked B, the next C, and so on, the major or positive phase-sequence being thus, in a three-phase system, $(\check{E}_{A_1})$, $(\check{E}_{B_1} = a^2\check{E}_{A_1})$, $(\check{E}_{C_1} = a\check{E}_{A_1})$ or, if the conjugate vectors are employed, as indicated in Fig. 5, the positive-phase-sequence quantities $e_{A_1}, e_{B_1}, e_{C_1}$ are indicated by the negatively rotating vectors, $$(\hat{E}_{A_1}), (\hat{E}_{B_1} = a\hat{E}_{A_1}), (\hat{E}_{C_1} = a^2\hat{E}_{A_1}).$$

Phase sequence, which is the relationship of the phases in a polyphase system, is thus to be carefully distinguished from the direction of rotation of the vectors representing the harmonic quantities under consideration.

If $e$ and $i$ are the instantaneous values of electro-motive force and current in a circuit, and $\check{E}$ and $\check{I}$ are the corresponding symbolic expressions for these quantities, we may put $$\begin{aligned}\check{E} &= E\epsilon^{j\omega t} & \hat{E} &= E\epsilon^{-j\omega t} \\ \check{I} &= I\epsilon^{j(\omega t-\theta)} & \hat{I} &= I\epsilon^{-j(\omega t-\theta)},\end{aligned} \quad (7)$$

and which means that we are assuming that the quantity $i$ lags behind the quantity $e$ by the phase-angle $\theta$. Thus $$e = \frac{1}{2}(\check{E}+\hat{E}) = \frac{1}{2}E[(\cos \omega t + j \sin \omega t) + (\cos \omega t - j \sin \omega t)]$$
$$= E \cos \omega t,$$
$$i = \frac{1}{2}(\check{I}+\hat{I}) = \frac{1}{2}I[\cos(\omega t-\theta) + j\sin(\omega t-\theta) + \cos(\omega t-\theta) - j\sin(\omega t-\theta)]$$
$$= I \cos(\omega t-\theta).$$

It thus follows that, to rotate a vector $i$ in the negative or lagging direction through an angle $-\theta$, its initial value being $i' = I \cos \omega t$, and its final value being $i''$, we have $$i'' = \frac{1}{2}(\check{I}''+\hat{I}'') = \frac{1}{2}(\check{I}'\epsilon^{-j\theta}+\hat{I}'\epsilon^{+j\theta}) = \frac{1}{2}(I\epsilon^{j\omega t}\epsilon^{-j\theta}+I\epsilon^{-j\omega t}\epsilon^{j\theta})$$
$$= I \cos(\omega t-\theta). \quad\quad\quad\quad\quad\quad (8)$$

Since E and I are the peak values of the harmonic quantities $e$ and $i$, we may put $P = \frac{1}{2}EI \cos \theta =$ the mean real power output of the system, and $Q = \frac{1}{2}EI \sin \theta =$ the reactive power or wattless lagging volt-ampere output corresponding to over-excited generator operation. From the above definitions of P and Q and equations (3) and (7), it follows that $$P + jQ = \frac{1}{2}EI \cos \theta + \frac{1}{2}jEI \sin \theta = \frac{1}{2}EI\epsilon^{j\theta} = \frac{1}{2}\check{E}\hat{I}. \quad\quad (9)$$

It will be noted that equation (9) is derived from equations (7), which express the condition where the current is lagging. Hence the reactive power Q is positive when the current is lagging and negative when the current is leading. This apparent inconsistency may be understood by remembering that the power $P+jQ$ involves the conjugate vector $\hat{I}$, which equals $I(\cos \theta - j \sin \theta)$, making Q positive when $\theta$ is negative. When Q is positive, it corresponds, therefore, to an over-excited generator, or a static condenser, when the equations represent supplied power; and an under-excited synchronous motor, or a static inductance device, when the equations represent loads. Conversely, negative values of Q represent the conditions obtaining with an under-excited generator, or a static inductance device, when the equations represent supplied power, and an over-excited synchronous motor, or a static condenser, when the equations represent loads.

*General explanation of the method of symmetrical co-ordinates as applied to three-phase systems.*

The resolution of vectors by the method of symmetrical co-ordinates consists in defining any system of $n$ co-planar vectors by means of $n$ other systems of co-planar congruent vectors which are symmetrical and have a common point. Thus, in any three-phase system of vectors, we may write the following identities, remembering that $(1+a+a^2)=0,$—

$$D_a = \frac{D_a+D_a+D_a+(1+a+a^2)(D_b+D_c)}{3}$$

$$D_b = \frac{D_b+D_b+D_b+(1+a+a^2)(D_a+D_c)}{3}$$

$$D_c = \frac{D_c+D_c+D_c+(1+a+a^2)(D_a+D_b)}{3}$$

whence $$\begin{aligned}D_a &= \frac{D_a+D_b+D_c}{3}+\frac{D_a+aD_b+a^2D_c}{3}+\frac{D_a+a^2D_b+aD_c}{3} \\ D_b &= \frac{D_a+D_b+D_c}{3}+a^2\frac{D_a+aD_b+a^2D_c}{3}+a\frac{D_a+a^2D_b+aD_c}{3} \\ D_c &= \frac{D_a+D_b+D_c}{3}+a\frac{D_a+aD_b+a^2D_c}{3}+a^2\frac{D_a+a^2D_b+aD_c}{3}\end{aligned} \quad (10)$$

Putting $$D_{a0} = \frac{D_a + D_b + D_c}{3}$$

$$D_{a1} = \frac{D_a + aD_b + a^2D_c}{3} \qquad \qquad (11)$$

$$D_{a2} = \frac{D_a + a^2D_b + aD_c}{3}$$

we have $$D_a = D_{a0} + D_{a1} + D_{a2}$$
$$D_b = D_{a0} + a^2D_{a1} + aD_{a2} \qquad (12)$$
$$D_c = D_{a0} + aD_{a1} + a^2D_{a2}$$

Or, equations (12) may be assumed and solved to find $D_{a0}$, $D_{a1}$ and $D_{a2}$, giving the same values as stated in equations (11).

Equations (12) mean that, in general, any three-phase system of vectors may be resolved into a zero-phase-sequence component, as $D_{a0}$, a positive-phase-sequence component, as $D_{a1}$, and a negative-phase-sequence component, as $D_{a2}$. Interpreting this statement as applied to a system of currents, the zero-phase-sequence component $\check{I}_{a0}$ is a current circulating around the delta without passing out into the line. As applied to star voltages, the presence of a zero-phase-sequence symmetrical component $\check{E}_{a0}$ would indicate that the centroid, or neutral point of the system, is displaced from zero potential by the fixed quantity $\check{E}_{a0}$, which is only possible if there is a source of potential for maintaining said condition.

Considering the following sequences of the cube roots of unity:

$$S^0 = a^0, a^0, a^0 = 1, 1, 1,$$
$$S^1 = a^0, a^{0-1}, a^{0-2} = 1, a^2, a,$$
$$S^2 = a^0, a^{0-2}, a^{0-4} = 1, a, a^2,$$

we may employ the sequence operator, $S$, to define the complete system of polyphase vectors, $D_a$, $D_b$, $D_c$, given in equations (12), as follows:

$$S(D_a) = S^0 D_{a0} + S^1 D_{a1} + S^2 D_{a2}, \quad (13)$$

where the sequence operator $S^0$, prefixed before the quantity $(D_{a0})$, is merely a shorthand method of writing the symmetrical zero-phase-sequence components, $(D_{a0})$, $(D_{b0}=D_{a0})$, $(D_{c0}=D_{a0})$, while the sequence operator $S^1$, prefixed before the quantity $(D_{a1})$, indicates the symmetrical positive-phase-sequence components, $(D_{a1})$, $(D_{b1}=a^2D_{a1})$, $(D_{c1}=aD_{a1})$, and the sequence operator $S^2$, prefixed before the principal phase quantity $D_{a2}$, indicates the symmetrical negative-phase-sequence components $(D_{a2})$, $(D_{b2}=aD_{a2})$, $(D_{c2}=a^2D_{a2})$. The signs of addition, subtraction, multiplication and division, placed between two or more symmetrical groups, which are indicated by sequence operators $S^0$, $S^1$, $S^2$, etc., prefixed to the principal phase, mean that the operations indicated are performed upon the corresponding phases of the respective groups.

When we multiply two groups of symmetrical components which are indicated by sequence operators, the exponents of the sequence operators must be added, as in ordinary algebra. Thus, if $S^1 Y_{a1}$ and $S^1 \check{I}_{a1}$ are multiplied, we have $$Y_{a1}\check{I}_{a1} = Y_{a1}\check{I}_{a1}$$
$$Y_{b1}\check{I}_{b1} = (a^2 Y_{a1})(a^2 \check{I}_{a1}) = a Y_{a1}\check{I}_{a1}$$
$$Y_{c1}\check{I}_{c1} = (a Y_{a1})(a\check{I}_{a5}) = a^2 Y_{a1}\check{I}_{a1},$$

which is a negative-phase-sequence system expressed by $$S^2(Y_{a1}\check{I}_{a1}).$$

Similarly, $$S^0 Y_{a0} S^1 \check{I}_{a1} = S^1(Y_{a0}\check{I}_{a1}); \; S^1 Y_{a1} S^2 \check{I}_{a2} =$$
$$S^0(Y_{a1}\check{I}_{a2}); \; S^2 Y_{a2} S^2 \check{I}_{a2} = S_1(Y_{a2}\check{I}_{a2}), \text{ etc.}$$

When conjugate vectors are employed, as indicated in Fig. 5, it is convenient to employ negative exponents, thus $S^{-1}\check{I}_{a1}$, $S^{-2}\check{I}_{a2}$, where, in a three-phase system, $S^{-1}=S^2$ and $S^{-2}=S^1$, in order that the rule regarding the addition of the exponents may be observed, since the conjugate vectors have negative exponents, as indicated in equations (5) and (7).

In the vectorial representation of polyphase systems, as indicated in Fig. 7, I shall distinguish the several phases of delta quantities by lower-case subscripts, as $\check{E}_a$, $\check{E}_b$, $\check{E}_c$, and the several phases of star quantities by capital subscripts, as $\check{E}_A$, $\check{E}_B$, $\check{E}_C$.

*General explanation of the method of symmetrical co-ordinates as applied to quarter-phase systems.*

In a four-phase system having star vectors $E_A$, $I_A$, etc., and mesh vectors $\check{E}_a$, $I_a$, etc., as indicated in Fig. 9, we will first consider the sequences, $$S^0 = j^0, j^0, j^0, j^0 = 1, 1, 1, 1$$
$$S^1 = j^0, j^{-1}, j^{-2}, j^{-3} = 1, -j, -1, +j$$
$$S^2 = j^0, j^{-2}, j^{-4}, j^{-6} = 1, -1, +1, -1 \qquad (14)$$
$$\text{and } S^3 = j^0, j^{-3}, j^{-6}, j^{-8} = 1, +j, -1, -j,$$

whence
$$\left.\begin{array}{l}S^{-1}=S^3\\S^{-2}=S^2\\S^{-3}=S^1\end{array}\right\} \quad\text{------(15)}$$

Assuming
$$S(\breve{I}_a) = S^0\breve{I}_{a0}+S^1\breve{I}_{a1}+S^2\breve{I}_{a2}+S^3\breve{I}_{a3}, \quad (16)$$

which means that $$\left.\begin{array}{l}\breve{I}_a=\breve{I}_{a0}+\breve{I}_{a1}+\breve{I}_{a2}+\breve{I}_{a3}\\\breve{I}_b=\breve{I}_{a0}-j\breve{I}_{a1}-\breve{I}_{a2}+j\breve{I}_{a3}\\\breve{I}_c=\breve{I}_{a0}-\breve{I}_{a1}+\breve{I}_{a2}-\breve{I}_{a3}\\\breve{I}_d=\breve{I}_{a0}+j\breve{I}_{a1}-\breve{I}_{a2}-j\breve{I}_{a3}\end{array}\right\} \quad (17)$$

and we find that $$\left.\begin{array}{l}\breve{I}_{a0}=\tfrac{1}{4}(\breve{I}_a+\breve{I}_b+\breve{I}_c+\breve{I}_d)\\\breve{I}_{a1}=\tfrac{1}{4}(\breve{I}_a+j\breve{I}_b-\breve{I}_c-j\breve{I}_d)\\\breve{I}_{a2}=\tfrac{1}{4}(\breve{I}_a-\breve{I}_b+\breve{I}_c-\breve{I}_d)\\\breve{I}_{a3}=\tfrac{1}{4}(\breve{I}_a-j\breve{I}_b-\breve{I}_c+j\breve{I}_d)\end{array}\right\} \quad (18)$$

and

For the conjugate vectors, we have
$$S(\hat{I}_a) = S^0\hat{I}_{a0}+S^{-1}\hat{I}_{a1}+S^{-2}\hat{I}_{a2}+S^{-3}\hat{I}_{a3}, \quad (19)$$

whence
$$\left.\begin{array}{l}\hat{I}_a=\hat{I}_{a0}+\hat{I}_{a1}+\hat{I}_{a2}+\hat{I}_{a3}\\\hat{I}_b=\hat{I}_{a0}+j\hat{I}_{a1}-\hat{I}_{a2}-j\hat{I}_{a3}\\\hat{I}_c=\hat{I}_{a0}-\hat{I}_{a1}+\hat{I}_{a2}-\hat{I}_{a3}\\\hat{I}_d=\hat{I}_{a0}-j\hat{I}_{a1}-\hat{I}_{a2}+j\hat{I}_{a3}\end{array}\right\} \quad (20)$$

and
$$\left.\begin{array}{l}\hat{I}_{a0}=\tfrac{1}{4}(\hat{I}_a+\hat{I}_b+\hat{I}_c+\hat{I}_d)\\\hat{I}_{a1}=\tfrac{1}{4}(\hat{I}_a-j\hat{I}_b-\hat{I}_c+j\hat{I}_d)\\\hat{I}_{a2}=\tfrac{1}{4}(\hat{I}_a-\hat{I}_b+\hat{I}_c-\hat{I}_d)\\\hat{I}_{a3}=\tfrac{1}{4}(\hat{I}_a+j\hat{I}_b-\hat{I}_c-j\hat{I}_d)\end{array}\right\} \quad (21)$$

Similar expressions are found for all other vectors, including voltages, both mesh and star; mesh vectors being indicated by lower-case subscripts, and star vectors by capital subscripts, as hereinbefore explained.

*General conditions for balanced three-phase operation.*

With the foregoing preliminary explanations, we will assume a three-phase system having three delta loads, $$(P_a+jQ_a), (P_b+jQ_b), (P_c+jQ_c).$$

Although the definitions of polyphase sequences as given above, depend upon the time-phase relations between the quantities in a sequence, the same mathematical expressions may be derived for any system of $n$ vectors whether they represent quantities varying harmonically with time or not. It is convenient to call such derived expressions the polyphase components of the $n$ vectors. Thus, the polyphase components of the three power quantities are:

$$\left.\begin{array}{l}P_{a0}+jQ_{a0}=\dfrac{P_a+P_b+P_c+j(Q_a+Q_b+Q_c)}{3}\\[4pt]P_{a1}+jQ_{a1}=\dfrac{P_a+aP_b+a^2P_c+j(Q_a+aQ_b+a^2Q_c)}{3}\\[4pt]P_{a2}+jQ_{a2}=\dfrac{P_a+a^2P_b+aP_c+j(Q_a+a^2Q_b+aQ_c)}{3}\end{array}\right\} \quad (22)$$

The delta electromotive forces $\breve{E}_a, \breve{E}_b, \breve{E}_c$ may be expressed in terms of symmetrical coordinates, $$S(\breve{E}_a) = S^1\breve{E}_{a1}+S^2\breve{E}_{a2}, \quad (23)$$

the zero-sequence term being omitted since the sum of the delta voltages, $(\breve{E}_a+\breve{E}_b+\breve{E}_c)$, which is equal to $3\breve{E}_{a0}$ according to equations (11), must be zero in any polyphase system.

The delta load currents $\breve{I}_a, \breve{I}_b, \breve{I}_c$ may be expressed by $$S(\breve{I}_a) = S^0\breve{I}_{a0}+S^1\breve{I}_{a1}+S^2\breve{I}_{a2} \quad (24)$$

There are zero-phase-sequence component currents flowing around the delta, although such component cannot appear in the line, since line currents are obtained by taking differences between delta currents, thus eliminating the zero-phase-sequence line-current component. This will be clear from an inspection of Fig. 7, wherein the impressed voltages and the load currents are shown in a three-phase system. Thus $$\left.\begin{array}{l}\breve{I}_A=\breve{I}_b-\breve{I}_c\\\breve{I}_B=\breve{I}_c-\breve{I}_a\\\breve{I}_C=\breve{I}_a-\breve{I}_b\end{array}\right\} \quad (25)$$

The delta loads may be expressed by $$\begin{aligned}S(P_a+jQ_a) &= \tfrac{1}{2}S(\breve{E}_a)S(\hat{I}_a)\\ &= \tfrac{1}{2}(S^1\breve{E}_{a1}+S^2\breve{E}_{a2})(S^0\hat{I}_{a0}+S^{-1}\hat{I}_{a1}+S^{-2}\hat{I}_{a2})\\ &= \tfrac{1}{2}S^0(\breve{E}_{a1}\hat{I}_{a1}+\breve{E}_{a2}\hat{I}_{a2}) + \tfrac{1}{2}S^1(\breve{E}_{a1}\hat{I}_{a0}+\breve{E}_{a2}\hat{I}_{a1}) + \tfrac{1}{2}S^2(\breve{E}_{a1}\hat{I}_{a2}+\breve{E}_{a2}\hat{I}_{a0}).\end{aligned}$$

Hence
$$P_{a0}+jQ_{a0}=\tfrac{1}{2}(\check{E}_{a1}\hat{I}_{a1}+\check{E}_{a2}\hat{I}_{a2})$$
$$P_{a1}+jQ_{a1}=\tfrac{1}{2}(\check{E}_{a1}\hat{I}_{a0}+\check{E}_{a2}\hat{I}_{a1})\quad(26)$$
$$P_{a2}+jQ_{a2}=\tfrac{1}{2}(\check{E}_{a1}\hat{I}_{a2}+\check{E}_{a2}\hat{I}_{a0})$$

We will now assume that the loads $(P_a+jQ_a)$, $(P_b+jQ_b)$ and $(P_c+jQ_c)$ are balanced. The conditions for balance are that the negative-phase-sequence components of the delta voltages and currents shall be zero, or $$S^2\check{E}_{a2}=0$$
$$S^{-2}\hat{I}_{a2}=0.\quad(27)$$

If either the source or the load is a balanced polyphase apparatus, either one of equations (27) will necessarily follow from the other, so that only one vector equation is necessary for balance. The zero-phase-sequence delta current component $\hat{I}_{a0}$ may have any value since it does not enter into the values of the line currents. With the conditions given in equations (27), we have, from equations (26), $$P_{a0}+jQ_{a0}=\tfrac{1}{2}\check{E}_{a1}\hat{I}_{a1}\quad(28)$$
$$P_{a1}+jQ_{a1}=\tfrac{1}{2}\check{E}_{a1}\hat{I}_{a0}\quad(29)$$
$$P_{a2}+jQ_{a2}=0\quad(30)$$

Equations (27) to (30) are, therefore, the sole conditions for obtaining balance. Expressing equation (30) in terms of the loads across the phases, as stated in equations (22), substituting the values of $a$ and $a^2$ as stated in equations (1), and equating real and imaginary parts, we have two equations determining a relation between the wattless load components $Q_a$, $Q_b$ and $Q_c$, for balanced conditions. Thus $$P_a-\tfrac{1}{2}(P_b+P_c)=-\tfrac{1}{2}\sqrt{3}(Q_b-Q_c)\quad(31)$$
$$\tfrac{1}{2}\sqrt{3}(P_b-P_c)=Q_a-\tfrac{1}{2}(Q_b+Q_c)\quad(32)$$

Equations (31) and (32) express the conditions for balanced three-phase operation, giving two relations between the unknown quantities $Q_a$, $Q_b$, $Q_c$ and the quantities $P_a$, $P_b$, $P_c$, which are supposed to be known. Therefore, one of the quantities $Q_a$, $Q_b$, $Q_c$ may be arbitrary. If, in addition to balanced operation, we assume a given power factor, a definite value is assigned to $Q_{a0}$, which is the reactive power or volt-amperes, of the balanced three-phase system. Thus, the proper values are assigned to $Q_a$, $Q_b$, $Q_c$ to give both balance and the required power factor.

The foregoing discussion is quite general, and therefore it applies equally to positive and negative values of the P's corresponding either to loads or to sources of energy, respectively.

*Operation of the three-phase system shown in Fig. 6.*

In certain cases where the source of power is unbalanced but the load is balanced, the power factor of the load is known but the power factor of the currents supplied to the network is required. An important example of this type is single-phase supply and balanced polyphase conversion. The polyphase power factor is determined solely by the character of the balanced load. In such cases, instead of balancing the output power of the system, which is already balanced, the input alone is balanced and the total input power both true and reactive, including that required to produce balance, is equal to the total output power, both true and reactive.

Thus, in Fig. 6, I show a balanced three-phase system 60 which is supplied with power from a single-phase line or other source 61. To obtain the total mean polyphase load, the terms of each sequence group are to be added, which will be designated by the operating symbol $\Sigma$. Hence, the mean polyphase load is obtained from equations (28) to (30) as follows:

$$P+jQ=\Sigma[S(P_a+jQ_a)]=\Sigma[S^0(P_{a0}+jQ_{a0})+S^1(P_{a1}+jQ_{a1})]=\tfrac{1}{2}\Sigma[S^0(\check{E}_{a1}\hat{I}_{a1})+S^1(\check{E}_{a1}\hat{I}_{a0})].$$

But the general expression $\Sigma S^1(x)$ is zero and the general expression $\Sigma S^0(x)$ is equal to three times the quantity $x$ in the brackets. The reason for this is that the positive-phase-sequence system of three-phase vectors $S^1(x)$ comprises the three quantities $x$, $a^2x$, $ax$, of which the sum, or $\Sigma S^1(x)$, is $(1+a^2+a)$, $x$, as explained in the definitions of the symbol $S^1$ in connection with equation (13). But the sum of the three cube roots of unity, $1+a+a^2$, is zero, as set forth in equation (1). Hence, $\Sigma S^1(x)=0$. In like manner, it is known that the zero-phase-sequence system of vectors $S^0(x)$ comprises the three equal vectors, $x$, $x$ and $x$, of which the sum, or $\Sigma S^0(x)$, is $3x$. We have, therefore, for the mean polyphase load, $$P+jQ=3P_{a0}+3jQ_{a0}\quad(33)$$

Referring again to Fig. 6, the total three-phase power, both actual and reactive, is supplied by a single-phase source in phase $a$ and pure reactance devices 62 and 63 in phases $b$ and $c$, respectively. The reactance devices shown are symbolic of any apparatus for this purpose, and may be either static apparatus or single-phase synchronous machines. We have, therefore, for the actual and reactive power supplied in the respective phases, $(P'_a+jQ'_a)$, $jQ'_b$, $jQ'_c$.

From equations (22) it follows that $$P'_{a0}+jQ'_{a0}= \tfrac{1}{3}P'_a+j(Q'_a+Q'_b+Q'_c) \quad (34)$$

$$P'_{a1}+jQ'_{a1}= \tfrac{1}{3}P'_a+j(Q'_a+aQ'_b+a^2Q'_c) \quad (35)$$

and $$P'_{a2}+jQ'_{a2}= \tfrac{1}{3}P'_a+j(Q'_a+a^2Q'_b+aQ'_c) \quad (36)$$

Since the system is balanced, we know, as in equation (30), that equation (36) is equal to zero and hence we have two equations similar to equations (31) and (32). Thus $$P'_a = -\tfrac{1}{2}\sqrt{3}(Q'_b - Q'_c) \quad (37)$$
$$0 = Q'_a - \tfrac{1}{2}(Q'_b + Q'_c) \quad (38)$$

The mean input power $P'+jQ'$ is an equation similar to (33). Thus $$P'+jQ' = 3P'_{a0} + 3jQ'_{a0} \quad (39)$$

Equation (39) represents the real and wattless supplied power. Equation (33) represents the real and wattless load. Equating the two, we have, from equation (34), $$P'_a = 3P'_{a0} = 3P_{a0} \quad (40)$$

$$Q'_a + Q'_b + Q'_c = 3Q'_{a0} = 3Q_{a0} \quad (41)$$

Equations (37) to (41) and (33) reduce to $$P'_a = 3P_{a0} = P \quad (42)$$

$$Q'_a = Q_{a0} = \tfrac{1}{3}Q \quad (43)$$

$$Q'_b = -\sqrt{3}P_{a0} + Q_{a0} = -\tfrac{1}{3}\sqrt{3}P + \tfrac{1}{3}Q = -\tfrac{1}{3}\sqrt{3}P'_a + Q'_a \quad (44)$$

$$Q'_c = \sqrt{3}P_{a0} + Q_{a0} = \tfrac{1}{3}\sqrt{3}P + \tfrac{1}{3}Q = \tfrac{1}{3}\sqrt{3}P'_a + Q'_a \quad (45)$$

The last four equations completely define the single-phase input power $P'_a + jQ'_a$ and the input reactive powers $jQ'_b$ and $jQ'_c$ in terms of the output three-phase power $P+jQ$.

Thus, in Fig. 7, the delta currents $\check{I}_a$, $\check{I}_b$, and $\check{I}_c$ are all either load currents or all supply currents. If the delta currents $\check{I}_a$, $\check{I}_b$ and $\check{I}_c$ are input currents supplying balanced load currents $\check{I}_A$, $\check{I}_B$ and $\check{I}_C$, as assumed in the mathematical discussion, the current $\check{I}_b$, which is supplied by the synchronous generator in the phase $b$ lagging the supply phase $a$, is leading, and the current $\check{I}_c$ supplied by the other synchronous machine or unloaded generator is lagging. On the other hand, if the balanced three-phase currents $\check{I}_A$, $\check{I}_B$ and $\check{I}_C$ are input currents, the delta currents $\check{I}_a$, $\check{I}_b$ and $\check{I}_c$ must be regarded as load currents, and the synchronous machine in phase $b$, which was formerly under-excited, will now be over-excited in order to draw leading currents, while the machine in phase $c$ will now be under-excited in order to draw lagging currents. The relations just given hold true provided that Q is not numerically greater than $\sqrt{3}P$, in which case the excitation of one of the machines would be reversed, as will be obvious from equations (44) and (45).

Since the systems are completely defined by equations (42) to (45), it follows that the desired balanced transformation may be obtained by simply adjusting the reactance devices 62 and 63 until their voltages are equal, in magnitude, to the voltage of the single-phase line. When this is done, the line currents supplied to the three-phase load will necessarily be balanced. Also, from equations (44) and (45), it is evident that balanced power, voltage and current may be maintained by wattmeters so connected as to measure real and reactive power, as indicated in Fig. 2.

From equations (42) and (43), it is seen that the single-phase power factor $P.F._1$ is always higher than the three-phase power factor $P.F._3$, the relations being $$P.F._1 = \frac{P'_a}{\sqrt{(P'_a)^2 + (Q'_a)^2}} = \frac{P}{\sqrt{P^2 + \tfrac{1}{9}Q^2}}$$

and $$P.F._3 = \frac{P}{\sqrt{P^2 + Q^2}}$$

$$(46)$$

The total K. V. A. capacity of the two single-phase synchronous condensers for producing balanced conditions in a three-phase line supplying a single-phase load P in the other phase is found from equations (44) and (45) to be $\tfrac{2}{3}\sqrt{3}P$ or 1.155 P. The figures just given, however, represent ideal conditions, where the power factor does not vary. Where the power factor is variable, the ratio must be increased in accordance with the least advantageous power factors.

*Conditions for balanced quarter-phase operation.*

In a quarter-phase system, as shown in Figs. 8 and 9, we will assume a balanced two-phase, diametrically connected load $P_X+jQ_X$ and $P_Y+jQ_Y$, designated by the numerals 64 and 65, said load being supplied by a single-phase line 66, furnishing the power $P'_X+jQ'_X$, and being balanced by four mesh-connected reactors 67 to 70 supplying the wattless power $S(jQ''_a)$.

Assuming that the only restrictions are that the currents in the two phases shall be equal and at right angles, and that a like relation holds for the voltages, we have:

$$\check{E}_X - j\check{E}_Y = 0 \quad\quad (47)$$

$$\check{I}_X - j\check{I}_Y = 0 \quad\quad (48)$$

or, taking the conjugates, $$\hat{I}_X + j\hat{I}_Y = 0 \quad\quad (49)$$

From the vector diagram, Fig. 9, we find the voltages $$\left.\begin{array}{l}\check{E}_X = -\check{E}_C + \check{E}_A \\ \check{E}_Y = -\check{E}_D + \check{E}_B\end{array}\right\} \quad (50)$$

which, substituted in equation (47), gives $$\check{E}_A - \check{E}_C = j\check{E}_B - j\check{E}_D \quad\quad (51)$$

$$\check{E}_{A3} = \tfrac{1}{4}(\check{E}_A - j\check{E}_B - \check{E}_C + j\check{E}_D) = 0 \quad (52)$$

and $$\check{E}_{A1} = \tfrac{1}{4}(\check{E}_A - \check{E}_C) + j(\check{E}_B - \check{E}_D) =$$
$$\tfrac{1}{2}(\check{E}_A - \check{E}_C) = \tfrac{1}{2}\check{E}_X \quad (53)$$

A zero-phase-sequence star voltage component $\check{E}_{A0}$ would mean that the voltage of every point in the system would be displaced, by the fixed amount $\check{E}_{A0}$, from the value it would have if the centroid or neutral point of the system were at zero potential, and since the system shown in Fig 8 contains no means for maintaining such a potential-difference, we have $$\check{E}_{A0} = 0 \quad\quad (54)$$

The load currents are:

$$\left.\begin{array}{l}\check{I}_X = \check{I}_A = -\check{I}_C \\ \check{I}_Y = \check{I}_B = -\check{I}_D\end{array}\right\} \quad (55)$$

By hypothesis, equation (48), $$\check{I}_Y = -j\check{I}_X, \text{ or } \hat{I}_Y = j\hat{I}_X,$$

whence $$\check{I}_B = -j\check{I}_A, \quad \hat{I}_B = j\hat{I}_A,$$

and $$\check{I}_D = -j\check{I}_C, \quad \hat{I}_D = j\hat{I}_C.$$

Substituting in equations (21), we find the symmetrical coordinates of the load currents to be $$\left.\begin{array}{l}\hat{I}_{A0} = 0 \\ \hat{I}_{A1} = \tfrac{1}{2}(\hat{I}_A - j\hat{I}_B) = \hat{I}_A \\ \hat{I}_{A2} = 0 \\ \hat{I}_{A3} = \tfrac{1}{2}(\hat{I}_A + j\hat{I}_B) = 0\end{array}\right\} \quad (56)$$

The balanced polyphase load is given by $$S(P_A + jQ_A) = \tfrac{1}{2}S(\check{E}_A)S(\hat{I}_A)$$
$$= \tfrac{1}{2}(S^1\check{E}_{A1} + S^2\check{E}_{A2})S^{-1}\hat{I}_{A1}$$
$$= \tfrac{1}{2}S^0(\check{E}_{A1}\hat{I}_{a1}) + \tfrac{1}{2}S^1(\check{E}_{A2}\hat{I}_{a1})$$

having the following symmetrical coordinates:—

$$\left.\begin{array}{l}P_{A0} + jQ_{A0} = \tfrac{1}{2}\check{E}_{A1}\hat{I}_{A1} \\ P_{A1} + jQ_{A1} = \tfrac{1}{2}\check{E}_{A2}\hat{I}_{A1} \\ P_{A2} + jQ_{A2} = 0 \\ P_{A3} + jQ_{A3} = 0\end{array}\right\} \quad (57)$$

The total mean load is $$P + jQ = \Sigma[S(P_A + jQ_A)] =$$
$$4(P_{A0} + jQ_{A0}) = 2\check{E}_{A1}\hat{I}_{A1}.$$

But, from equations (53), (55) and (56), $$\check{E}_{A1} = \tfrac{1}{2}\check{E}_X$$

and $$\hat{I}_{A1} = \hat{I}_X$$

$$\check{E}_{A1}\hat{I}_{A1} = \tfrac{1}{2}\check{E}_X\hat{I}_X = \tfrac{1}{2}(j\check{E}_Y)(-j\hat{I}_Y) =$$
$$\tfrac{1}{2}\check{E}_Y\hat{I}_Y = P_X + jQ_X = P_Y + jQ_Y \quad (58)$$

The total load is, therefore, $$P + jQ = 2\check{E}_{A1}\hat{I}_{A1} =$$
$$2(P_X + jQ_X) = 2(P_Y + jQ_Y) \quad (59)$$

Let the single-phase input be $$P'_X + jQ'_X = \tfrac{1}{2}\check{E}_X\hat{I}_X \quad\quad (60)$$

The single-phase currents are $$\hat{I}'_A = -\hat{I}'_C = \hat{I}'_X$$

and $$\hat{I}'_B = -\hat{I}'_D = \hat{I}'_Y = 0,$$

whence $$\hat{I}'_{A0} = \hat{I}'_{A2} = 0$$

and $$\hat{I}'_{A1} = \hat{I}'_{A3} = \tfrac{1}{4}(\hat{I}'_A - \hat{I}'_C) = \tfrac{1}{2}\hat{I}'_X.$$

The single-phase input may be written $$S(P'_A + jQ'_A) = \tfrac{1}{2}S(\check{E}_A)S(\hat{I}'_A)$$
$$= \tfrac{1}{2}(S^1\check{E}_{A1} + S^2\check{E}_{A2})(S^{-1}\hat{I}'_{A1} + S^{-3}\hat{I}'_{A3})$$
$$= \tfrac{1}{2}S^0(\check{E}_{A1}\hat{I}'_{A1}) + \tfrac{1}{2}S^2(\check{E}_{A2}\hat{I}'_{A1}) + \tfrac{1}{2}S^2(\check{E}_{A1}\hat{I}'_{A3}) + \tfrac{1}{2}S^3(\check{E}_{A2}\hat{I}'_{A3}).$$

The symmetrical coordinates of the single-phase input are, therefore, $$\left.\begin{array}{l}P'_{A0}+jQ'_{A0}=\tfrac{1}{2}\check{E}_{A1}\hat{I}'_{A1}=\\ \qquad \tfrac{1}{8}\check{E}_{X}\hat{I}'=\tfrac{1}{4}(P'_{X}+jQ'_{X}).\\ P'_{A1}+jQ'_{A1}=\tfrac{1}{2}\check{E}_{A2}\hat{I}'_{A1}=\tfrac{1}{4}\check{E}_{A2}\hat{I}'_{X}\\ P'_{A2}+jQ'_{A2}=\tfrac{1}{2}\check{E}_{A1}\hat{I}'_{A3}=\\ \qquad \tfrac{1}{8}\check{E}_{X}\hat{I}'_{X}=\tfrac{1}{4}(P'_{X}+jQ'_{X}).\\ P'_{A3}+jQ'_{A3}=\tfrac{1}{2}\check{E}_{A2}\hat{I}'_{A3}=\tfrac{1}{4}\check{E}_{A2}\hat{I}'_{X}.\end{array}\right\} \text{--(61)}$$

Let the wattless supply currents $S(\hat{I}''_a)$ in the mesh phases supply the wattless power, $$jQ''=\Sigma S(jQ''_a)=\tfrac{1}{2}\Sigma S(\check{E}_a\hat{I}''_a)\text{----(62)}$$

Since the input currents are equal to the output currents, we may write, from an inspection of Fig. 9, $$\hat{I}''_d-\hat{I}''_a=\hat{I}_Y$$
$$\hat{I}''_b-\hat{I}''_c=\hat{I}_Y.$$

whence $$\hat{I}''_a-\hat{I}''_b+\hat{I}''_c-\hat{I}''_d=-\hat{I}_Y+\hat{I}_Y=0$$
$$\hat{I}''_{a2}=\tfrac{1}{4}(\hat{I}''_a-\hat{I}''_b+\hat{I}''_c-\hat{I}''_d)=0\text{-----(63)}$$

The line currents $S(\hat{I}''_A)$ corresponding to the delta reactance currents $S(\hat{I}''_a)$ are obtained from an inspection of Fig. 9 and from equations (20) and (63). Thus:

$$\left.\begin{array}{l}\hat{I}''_A=\hat{I}''_c-\hat{I}''_d=\\ \qquad -(1-j)\hat{I}''_{a1}-(1+j)\hat{I}''_{a3}\\ \hat{I}''_B=\hat{I}''_d-\hat{I}''_a=\\ \qquad -(1+j)\hat{I}''_{a1}-(1-j)\hat{I}''_{a3}\\ \hat{I}''_C=\hat{I}''_a-\hat{I}''_b=\\ \qquad +(1-j)\hat{I}''_{a1}+(1+j)\hat{I}''_{a3}\\ \hat{I}''_D=\hat{I}''_b-\hat{I}''_c=\\ \qquad +(1+j)\hat{I}''_{a1}+(1-j)\hat{I}''_{a3}\end{array}\right\}\text{--(64)}$$

Substituting from equations (64), in equations (21), we find $$\left.\begin{array}{l}\hat{I}''_{A0}=\tfrac{1}{4}(\hat{I}''_A+\hat{I}''_B+\hat{I}''_C+\hat{I}''_D)=0\\ \hat{I}''_{A1}=\tfrac{1}{4}(\hat{I}''_A-j\hat{I}''_B-\hat{I}''_C+j\hat{I}''_D)=\\ \qquad -(1-j)\hat{I}''_{a1}\\ \hat{I}''_{A2}=\tfrac{1}{4}(\hat{I}''_A-\hat{I}''_B+\hat{I}''_C-\hat{I}''_D)=0\\ \hat{I}''_{A3}=\tfrac{1}{4}(\hat{I}''_A+j\hat{I}''_B-\hat{I}''_C-j\hat{I}''_D)=\\ \qquad -(1+j)\hat{I}''_{a3}\end{array}\right\}\text{--(65)}$$

The relations between the delta voltages $S(\check{E}_a)$ and the star voltages $S(\check{E}_A)$ are also shown in Fig. 9. Thus $$\check{E}_a=-\check{E}_B+\check{E}_C$$
$$\check{E}_b=-\check{E}_C+\check{E}_D$$
$$\check{E}_c=-\check{E}_D+\check{E}_A$$
$$\check{E}_d=-\check{E}_A+\check{E}_B.$$

Substituting from equations (18), (50), (51) and (53), we find $$\left.\begin{array}{l}\check{E}_{a0}=\tfrac{1}{4}(\check{E}_a+\check{E}_b+\check{E}_c+\check{E}_d)=0\\ \check{E}_{a1}=\tfrac{1}{4}(\check{E}_a+j\check{E}_b-\check{E}_c-j\check{E}_d)=-\tfrac{1}{4}(1-j)(\check{E}_A-\check{E}_C)-\tfrac{1}{4}(1+j)(\check{E}_B-\check{E}_D)\\ \qquad =-\tfrac{1}{2}(1-j)(\check{E}_A-\check{E}_C)=-(1-j)\check{E}_{A1}\\ \check{E}_{a2}=\tfrac{1}{4}(\check{E}_a-\check{E}_b+\check{E}_c-\check{E}_d)=\tfrac{1}{2}(\check{E}_A-\check{E}_B+\check{E}_C-\check{E}_D)=2\check{E}_{A2}\\ \check{E}_{a3}=\tfrac{1}{4}(\check{E}_a-j\check{E}_b-\check{E}_c+j\check{E}_d)=-\tfrac{1}{4}(1+j)(\check{E}_A-j\check{E}_B-\check{E}_C+j\check{E}_D)=0.\end{array}\right\}\text{--- (66)}$$

In order to facilitate the control, we will impose a further limitation on the system, in addition to the limitations expressed by equations (47) and (48), namely, that the voltages of the reactances in opposite arms of the bridge shall be equal and opposite to each other. Thus $$\check{E}_a=-\check{E}_c \text{----------------------- (67)}$$

and $$\check{E}_b=-\check{E}_d, \text{---------------------- (68)}$$

whence $$\check{E}_{A2}=\tfrac{1}{2}\check{E}_{a2}=\tfrac{1}{8}[(\check{E}_a+\check{E}_c)-(\check{E}_b+\check{E}_d)]=0. \text{--------- (69)}$$

$$\left.\begin{array}{r}\therefore P_{A1}+jQ_{A1}=\tfrac{1}{2}\check{E}_{A2}\hat{I}_{A1}=0\\ P'_{A1}+jQ'_{A1}=\tfrac{1}{4}\check{E}_{A2}\hat{I}'_X=0\\ \text{and}\\ P'_{A3}+jQ'_{A3}=\tfrac{1}{4}\check{E}_{A2}\hat{I}'_X=0.\end{array}\right\}\text{-----(70)}$$

The wattless power supplied in the mesh phases by the reactance devices is $$S(jQ''_a) = \tfrac{1}{2} S(\check{E}_a) S(\hat{I}''_a)$$
$$= \tfrac{1}{2} (S^1\check{E}_{a1})(S^0\hat{I}''_{a0} + S^{-1}\hat{I}''_{a1} + S^{-3}\hat{I}''_{a3})$$
$$= \tfrac{1}{2} S^0 \check{E}_{a1}\hat{I}''_{a1} + \tfrac{1}{2} S^1 \check{E}_{a1}\hat{I}''_{a0} + \tfrac{1}{2} S^2 \check{E}_{a1}\hat{I}''_{a3},$$

whence $$jQ''_{a0} = \tfrac{1}{2} \check{E}_{a1}\hat{I}''_{a1}$$
$$jQ''_{a1} = \tfrac{1}{2} \check{E}_{a1}\hat{I}''_{a0}$$
$$jQ''_{a2} = \tfrac{1}{2} \check{E}_{a1}\hat{I}''_{a3}$$
$$jQ''_{a3} = 0.$$

The wattless power supplied in the star phases by the reactance devices in the mesh phases is $$S(jQ''_A) = \tfrac{1}{2} S(\check{E}_A) S(\hat{I}''_A)$$
$$\tfrac{1}{2}(S^1\check{E}_{A1})(S^{-1}\hat{I}''_{A1} + S^{-3}\hat{I}''_{A3})$$
$$\tfrac{1}{2} S^0 (\check{E}_{A1}\hat{I}''_{A1}) + \tfrac{1}{2} S^2 (\check{E}_{A1}\hat{I}''_{A3}),$$

having the following symmetrical coordinates:—

$$\left.\begin{array}{l} jQ''_{A0} = \tfrac{1}{2}\check{E}_{A1}\hat{I}''_{A1} = \tfrac{1}{2}[-\tfrac{1}{2}(1+j)\check{E}_{a1}][-(1-j)\hat{I}''_{a1}] = \tfrac{1}{2}\check{E}_{a1}\hat{I}''_{a1} = jQ''_{a0} \\ \qquad = \tfrac{1}{4}j(Q''_a + Q''_b + Q''_c + Q''_d) \\ jQ''_{A1} = 0 \\ jQ''_{A2} = \tfrac{1}{2}\check{E}_{A1}\hat{I}''_{A3} = \tfrac{1}{2}[-\tfrac{1}{2}(1+j)\check{E}_{a1}][-(1+j)\hat{I}''_{a3}] = \tfrac{1}{2}j\check{E}_{a1}\hat{I}''_{a3} = -Q''_{a2} \\ \qquad = \tfrac{1}{4}(Q''_a - Q''_b + Q''_c - Q''_d) \\ jQ''_{A3} = 0. \end{array}\right\} \quad (71)$$

Equating the coordinates of the two-phase load, equations (57), to the sums of the single-phase input and the wattless power input of the reactors, equations (61) plus equations (71), we find, remembering equations (58) and (70), $$P_{A0} + jQ_{A0} = \tfrac{1}{2}\check{E}_{A1}\hat{I}_{A1} = \tfrac{1}{2}(P_x + jQ_x) = \tfrac{1}{4}(P'_x + jQ'_x) + \tfrac{1}{4}j(Q''_a + Q''_b + Q''_c + Q''_d).$$

$$\left.\begin{array}{l} \therefore 2P_x = P'_x \\ 2Q_x = Q'_x + Q''_a + Q''_b + Q''_c + Q''_d. \end{array}\right\} \quad (72)$$

$$P_{A2} + jQ_{A2} = 0 = \tfrac{1}{4}(P'_x + jQ'_x) + \tfrac{1}{4}(Q''_a - Q''_b + Q''_c - Q''_d).$$

$$\left.\begin{array}{l} \therefore P'_x = -Q''_a + Q''_b - Q''_c + Q''_d \\ Q'_x = 0. \end{array}\right\} \quad (73)$$

Assuming the load $P_x + jQ_x$ to be known, we have the following values. The single-phase power component is $$P'_x = 2P_x. \quad (74)$$

The single-phase wattless component is $Q'_x = 0$, meaning unity power-factor single-phase current. The reactor volt-amperes are $$\left.\begin{array}{l} Q''_a + Q''_c = -P_x + Q_x \\ Q''_b + Q''_d = P_x + Q_x. \end{array}\right\} \quad (75)$$

The foregoing demonstration shows that a balanced diametrically connected two-phase load may be supplied by a diametrically connected single-phase source if wattless currents are supplied in the mesh phases in such quantities as to make the mesh voltages all equal in magnitude, as asserted by equations (66) and (69). Since the quantities may have the minus sign, the same demonstration holds for a balanced polyphase supply and a single-phase load, and since an unbalanced supply or load may be resolved into a balanced polyphase component and a single-phase component, the single-phase power may be replaced by an unbalanced polyphase power having the same single-phase component.

In the two-phase system just described, the reactance elements of the bridge are not tuned, as in the case of a monocyclic square, but their values will depend upon the two-phase load. With an inductive load the capacity reactance predominates and with a leading power-factor load the inductive reactance predominates. The single-phase power factor is always unity, and there is no restriction on the polyphase power factor.

The total K. V. A. capacity of the four single-phase reactors in a quarter-phase line, supplying a load $P_x + jQ_x = P_Y + jQ_Y$ from a single-phase source $P'_x = 2P_x$, is found from equations (75) to be $2P_x$ or $P'_x$, for polyphase power-factors greater than 0.707.

This is $\frac{1}{1.155}$ or 0.866 as much reactive K. V. A. as is required in the three-phase system.

From equations (75) it is evident that we may make $Q''_a = Q''_c$ and $Q''_b = Q''_d$, and since the corresponding voltages are equal and opposite, the reactive power may be supplied by two single-phase synchronous condensers connected to the secondaries of two transformers, each having two primary windings, as indicated in Fig. 3. Instead of controlling the voltages, therefore, it is possible to regulate the single-phase synchronous condensers in accordance with equations (75), by means similar to that shown in Fig. 2.

Summary of the operation.

The operation of the systems shown in Figs. 1, 2 and 3 will now be clear. In the usual case of tie lines connecting independent alternating-current transmission lines, each having its own voltage-controlling means, slight discrepancies in the voltages at the two ends of the tie line are compensated for by the automatic shifting of the power factor, producing leading or lagging currents in the tie line, which, flowing through the inductive impedance of the tie line, inherently boost or buck the tie line voltage. In Figs. 1, 2 and 3, the polyphase and single-phase lines may both be transmission lines having independently operated synchronous machines for controlling their voltages, or either one of the lines may be fixed in voltage, the other line having no fixed voltage except as determined by its tie-line connection. In the three-phase systems shown in Figs. 1 and 2, the single-phase power factor may have any value, and there is no limitation on the polyphase and single-phase lines except that their voltages should be approximately equal.

In the four-phase system shown in Fig. 3, the single-phase tie line must have unity power-factor. Since the interchange of power between interconnected alternating-current systems is dependent on the tendency of one system to operate at a higher or a lower frequency, and not on the voltages, the power-factor regulator is necessary whenever the voltages of both systems are independently regulated. In such case, the power-factor regulator is preferably placed near the end of the tie line which connects to the two-phase system in order that the necessary wattless currents may be circulated, through substantially the whole inductance of the tie line, between the power-factor regulator and the single-phase system. The means for maintaining unity power factor is not required in case the voltage of the single-phase line is independently controlled by synchronous machines, and the voltage of the balanced polyphase line or translating device is not fixed, regardless of the direction of flow of the power.

In the foregoing specification, I have described my invention and explained its underlying principles and its application in several different embodiments. It is obvious that many changes may be made without departing from the spirit of my invention and I desire that all such changes shall be construed to be within the language of the appended claims.

I claim as my invention:

1. The combination with a four-phase system including supply and load means and a power line therebetween transmitting a diametrically flowing balanced polyphase power component and a diametrically flowing unbalanced single-phase power component, of a plurality of single-phase reactance devices connected across the mesh phases of the system, a diametrically connected single-phase variable reactance device whereby correction may be made for the unbalanced wattless single-phase component, and electro-responsive means for controlling the mesh reactances in pairs whereby the voltage of each mesh reactance is made equal to that of the opposite mesh reactance and is balanced against 0.707 times a diametrical voltage of the system.

2. The combination with a balanced quarter-phase load device, of a single-phase supply circuit diametrically connected thereto, a plurality of single-phase reactance devices connected across the mesh phases of the system, and electro-responsive means for controlling the mesh reactances in pairs whereby the voltage of each mesh reactance is made equal to that of the opposite mesh reactance and is balanced against 0.707 times a diametrical voltage of the system.

3. The combination with a balanced, diametrically connected two-phase load device, of a single-phase supply circuit diametrically connected thereto, a plurality of single-phase reactance devices connected across the mesh phases of the load device, and electro-responsive means for controlling the mesh reactances in pairs whereby the voltage of each mesh reactance is made equal to that of the opposite mesh reactance and is balanced against 0.707 times a diametrical voltage of the system.

4. The combination with a four-phase system having diametrically connected polyphase-energy-translating devices, of a single-phase-energy-translating device connected across one diametrical phase of said system, power-factor-correcting means associated with said single-phase device, a power-factor relay associated with said correcting means for maintaining substantially unity-power factor in the connections between said single-phase device and said four-phase system, a plurality of single-phase reactance devices connected across the mesh phases of the system, and electro-responsive means for controlling the mesh reactances in pairs, whereby the voltage of each mesh reactance is made equal to that of the opposite mesh reactance and is balanced against 0.707 times a diametrical voltage of the system.

5. The combination with a four-phase system having diametrically connected polyphase-energy-translating devices, of a single-phase-energy-translating device connected across one diametrical phase of said system, power-factor-correcting means associated with said single-phase device, a power-factor relay associated with said correcting means for maintaining substantially unity-power factor in the connections between said single-phase device and said four-phase system, a pair of substantially free-running single-phase synchronous machines, a pair of inductively coupled windings associated with each of said machines whereby said machines are connected to different pairs of opposite-mesh phases of said system, means for exciting said machines, and separate electro-responsive means for controlling the excitation of each machine, whereby the voltage of one of the mesh phases associated with each machine is balanced against approximately 0.707 times a diametrical voltage of the system.

6. The combination with a balanced, diametrically connected two-phase load device, of a single-phase supply circuit diametrically connected thereto, a pair of substantially free-running single-phase synchronous machines, a pair of inductively coupled windings associated with each of said machines whereby said machines are connected to difference pairs of opposite-mesh phases of said load device, means for exciting said machines, and separate electro-responsive means for controlling the excitation of each machine whereby the voltage of one of the mesh phases associated with each machine is balanced against approximately 0.707 times a diametrical voltage of the load device.

7. The combination with a polyphase line, of two single-phase reactance devices connected across two phases thereof, and electro-responsive regulating means for independently varying the reactance of each device in response to variations in the ratio between an electrical quantity in its phase and the corresponding electrical quantity in a phase other than said two phases.

8. The combination with a polyphase line, of two single-phase reactance devices connected across two phases thereof, and electro-responsive regulating means for independently varying the reactance of each device in response to variations in the ratio between the voltage of its phase and the voltage of a phase other than said two phases.

9. The combination with a polyphase line, of two single-phase synchronous machines connected across two phases thereof, variable exciting means for said machines, and electro-responsive regulating means for independently varying the excitation of each machine in response to variations in the ratio between the voltage of its phase and the voltage of a phase other than said two phases.

10. The method of utilizing the wattless currents drawn by two single-phase reactance devices connected across two phases of a polyphase line for controlling a polyphase electrical quantity in said line, which consists in independently adjusting each device to maintain a predetermined ratio between the electrical quantity in its phase and a corresponding electrical quantity in a phase other than said two phases.

11. The method of utilizing the wattless currents drawn by two single-phase reactance devices connected across two phases of a polyphase line for controlling the polyphase voltage in said line, which consists in independently adjusting each device to maintain a predetermined ratio between the voltage in its phase and the voltage in a phase other than said two phases.

12. The combination with a four-phase system including supply and load means and a power line therebetween transmitting a diametrically flowing balanced power component and a diametrically flowing unbalanced single-phase power component, of a single single-phase apparatus for supplying reactive currents to two opposite mesh phases of said system, a single single-phase apparatus for supplying reactive currents of opposite sense to the two remaining mesh phases of said system, a transformer associated with each of said apparatus and having a primary winding connected to the apparatus and two secondary windings connected to the two mesh phases respectively, and electro-responsive means for so controlling the magnitudes of the reactive currents supplied by said apparatus as to cause substantially balanced conditions to obtain in said system.

13. The combination with a four-phase system including supply and load means and a power line therebetween transmitting a diametrically flowing balanced power component and a diametrically flowing unbalanced single-phase power component, of two single-phase dynamo-electric machines capable of delivering variable single-phase reactive currents, a transformer associated with each of said machines, each transformer having a single primary winding connected to the associated machine and two secondary windings connected to two opposite mesh phases of said system, and voltage-responsive means for controlling the reactive currents supplied by said machine whereby the same voltage is maintained in each machine.

14. The combination with a four-phase system, and a single-phase system of the same frequency, of means for effecting an interchange of energy therebetween without disturbing the condition of balance existing in the four-phase system, said means comprising a single-phase tie line connecting said single-phase system with a diametrical phase of said four-phase system, a unity-power-factor relay responsive to the current flowing from said tie line to said diametrical phase, or vice versa, means responsive to said relay for supplying such reactive currents to said single-phase system as to maintain said tie-line current at substantially unity power factor, a plurality of single-phase reactance devices connected to the mesh phases of said four-phase system, and electro-responsive means for so varying said reactance devices as to cause the reactive currents of the same to effect a substantially equal distribution of the single-phase energy of said tie line between the two diametrical phases of said four-phase system.

15. The combination with a four-phase system, and a single-phase system of the same frequency, of means for effecting an interchange of energy therebetween without disturbing the condition of balance existing in the four-phase system, said means comprising a single-phase tie line connecting said single-phase system with a diametrical phase of said four-phase system, a unity-power-factor relay responsive to the current flowing from said tie line to said diametrical phase, or vice versa, means responsive to said relay for supplying such reactive currents to said single-phase system as to maintain said tie-line current at substantially unity power factor, and an electro-responsive network composed of single-phase reactive-current devices so connected and controlled as to maintain substantially balanced conditions in said four-phase system.

In testimony whereof, I have hereunto subscribed my name this 13th day of June 1925.

CHARLES LE G. FORTESCUE.

Certificate of Correction.

Patent No. 1,658,980.          Granted February 14, 1928, to

CHARLES LE G. FORTESCUE.

It is hereby certified that error appears in the printed specification of the above numbered patent requiring corrections as follows: Page 3, in the first two equations (1) for the symbol "$\sqrt{3j}$" read "$\sqrt{3}j$"; page 5, lines 16 and 19, for "$\breve{E}_{ao}$" read $\breve{E}_{Ao}$; same page, line 71, for "$S^1Y_{a1}\breve{S}^2I_{a2}$" read $S^1Y_{a1}S^2\breve{I}_{a2}$; page 7, line 102, strike out comma, first occurrence; page 8, line 14, equation 37, after "$Q'_c$" insert a closing parenthesis; page 9, line 99, equation 60, for "$\hat{I}_x$" read $\hat{I}'_x$; page 10, line 21, before "$\hat{I}_Y$" insert a minus sign, so that the line will read $\hat{I}''_b - \hat{I}''_c = -\hat{I}_Y$; page 13, line 41, for "ference" read *ferent*; and that the said Letters Patent should be read with these corrections therein that the same may conform to the record of the case in the Patent Office.

Signed and sealed this 16th day of October, A. D. 1928.

[SEAL.]          M. J. MOORE,
*Acting Commissioner of Patents.*

Certificate of Correction.

Patent No. 1,658,980.                                        Granted February 14, 1928, to

CHARLES LE G. FORTESCUE.

It is hereby certified that error appears in the printed specification of the above numbered patent requiring corrections as follows: Page 3, in the first two equations (1) for the symbol "$\sqrt{3j}$" read "$\sqrt{3}j$"; page 5, lines 16 and 19, for "$\breve{E}_{a0}$" read $\breve{E}_{A0}$; same page, line 71, for "$S^1 Y_{a1} \breve{S}^2 I_{a2}$" read $S^1 Y_{a1} S^2 I_{a2}$; page 7, line 102, strike out comma, first occurrence; page 8, line 14, equation 37, after "$Q'_c$" insert a closing parenthesis; page 9, line 99, equation 60, for "$\hat{I}_x$" read $\hat{I}'_x$; page 10, line 21, before "$\hat{I}_Y$" insert a minus sign, so that the line will read $\hat{I}''_b - \hat{I}''_c = -\hat{I}_Y$; page 13, line 41, for "ference" read *ferent;* and that the said Letters Patent should be read with these corrections therein that the same may conform to the record of the case in the Patent Office.

Signed and sealed this 16th day of October, A. D. 1928.

[SEAL.]

M. J. MOORE,
*Acting Commissioner of Patents.*